Aug. 26, 1952          C. H. SAUER          2,608,262
VEHICLE STABILIZING AND CONTROL SYSTEM
Filed June 1, 1946          3 Sheets-Sheet 2
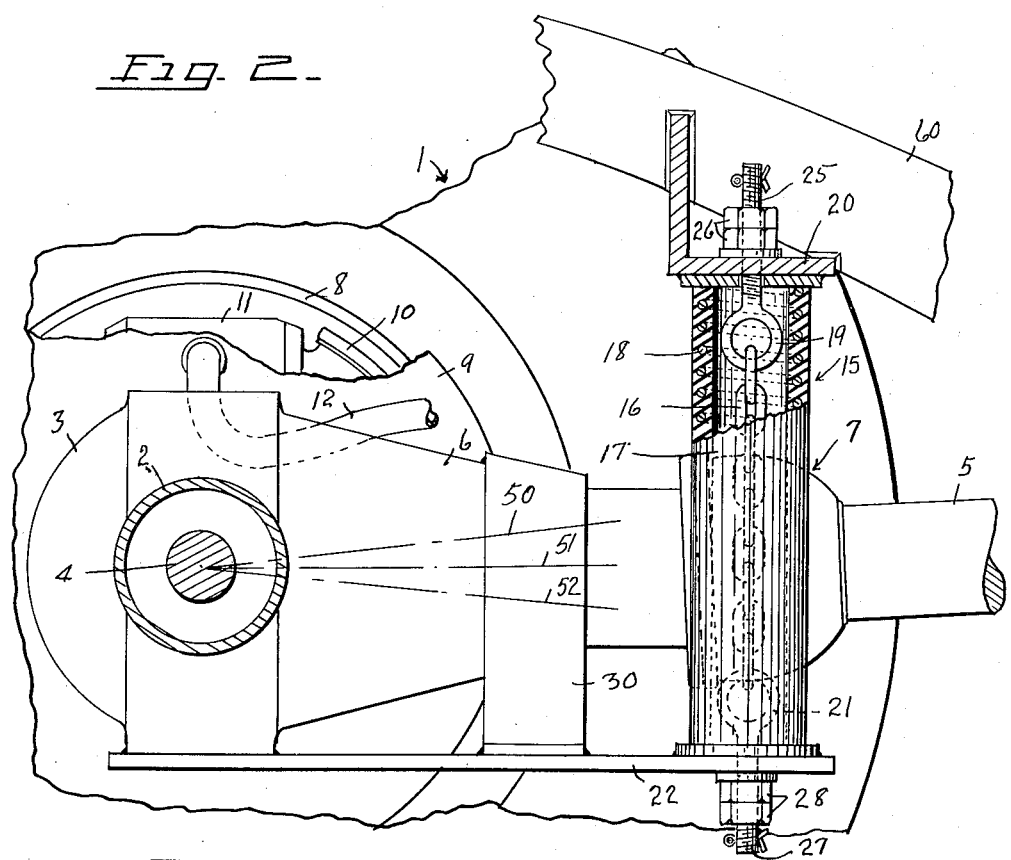
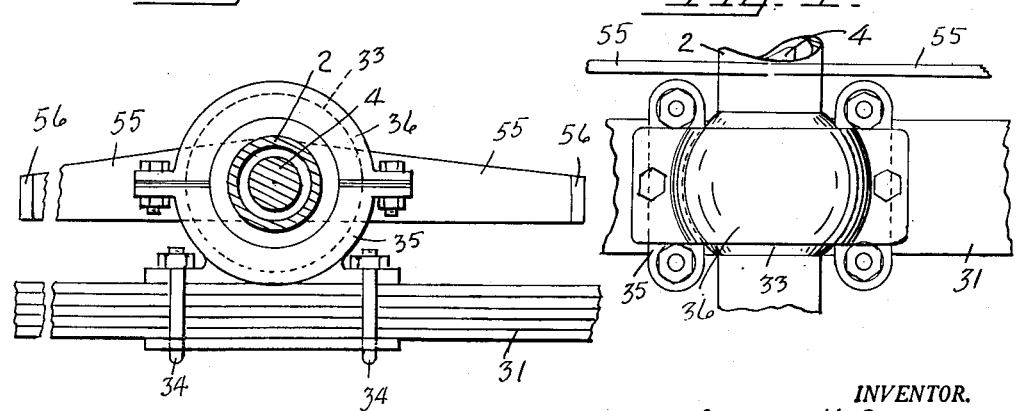
INVENTOR.
CHRISTIAN H. SAUER
BY
Boyken, Mohler + Beckley
ATTORNEYS Aug. 26, 1952     C. H. SAUER     2,608,262
VEHICLE STABILIZING AND CONTROL SYSTEM
Filed June 1, 1946     3 Sheets-Sheet 3
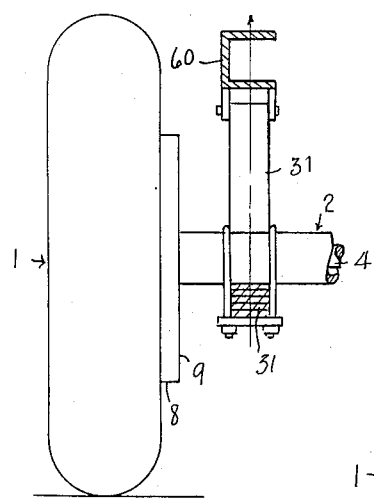
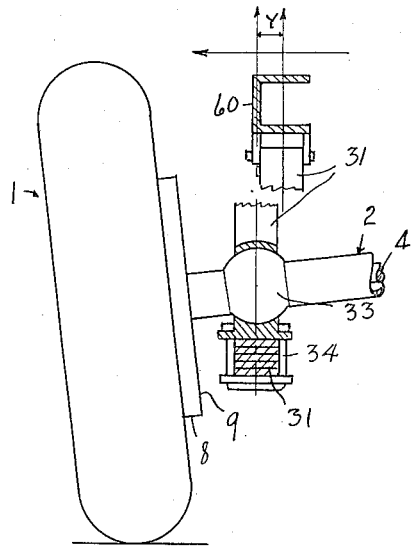
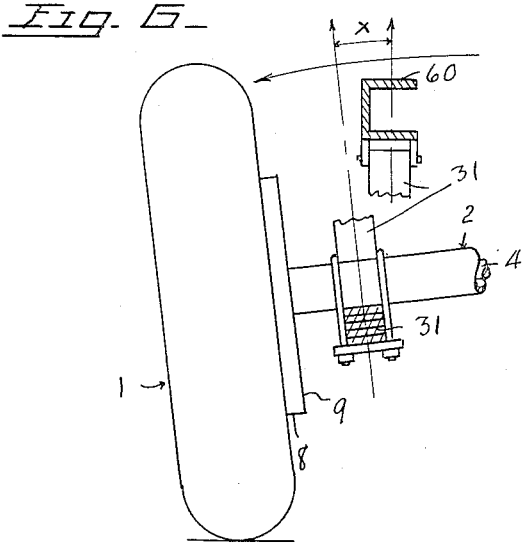
INVENTOR.
CHRISTIAN H. SAUER
BY
Boyken, Mohler & Beckley
ATTORNEYS.

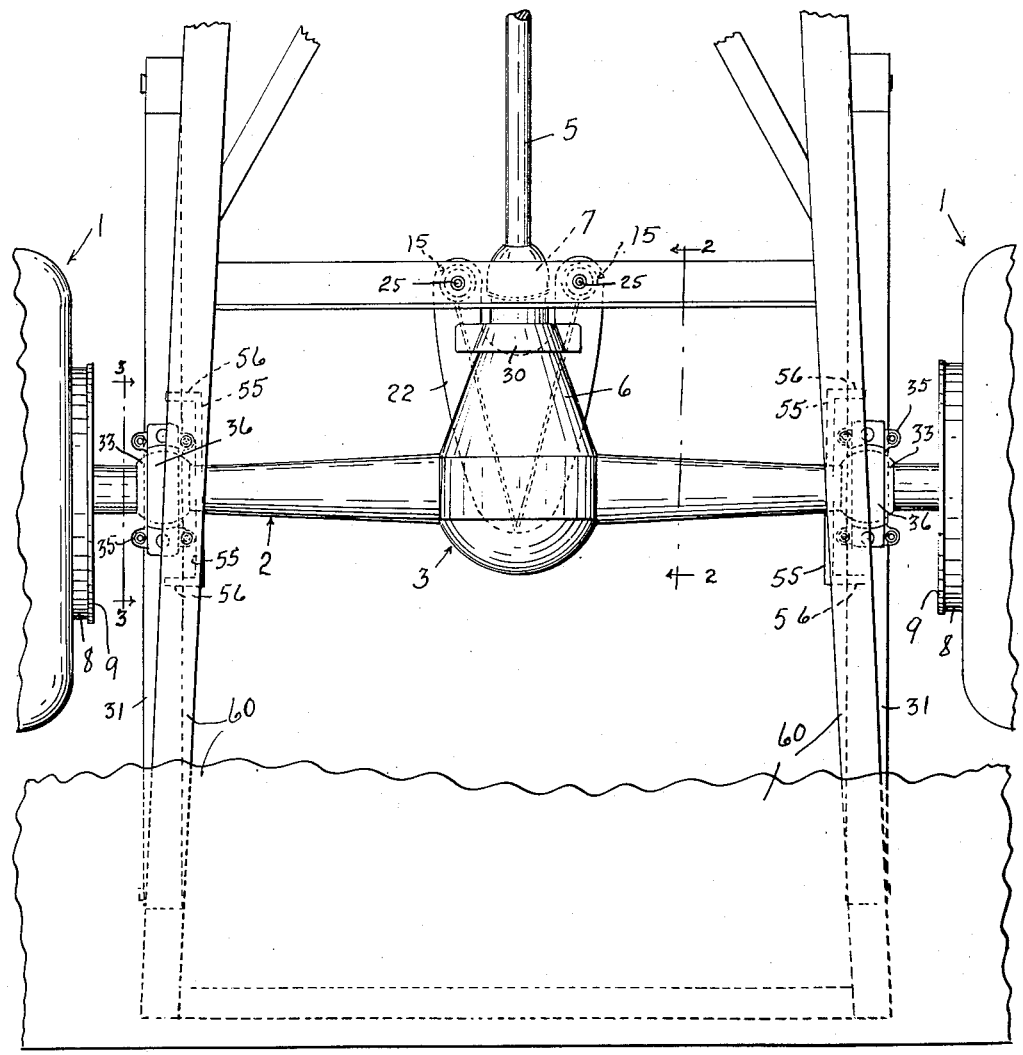

Patented Aug. 26, 1952

2,608,262

UNITED STATES PATENT OFFICE 2,608,262

VEHICLE STABILIZING AND CONTROL SYSTEM

Christian H. Sauer, Chico, Calif., assignor to J. T. Alm, Chico, Calif.

Application June 1, 1946, Serial No. 673,773

13 Claims. (Cl. 180—71)

This invention relates to a vehicle stabilizing and body control system.

Heretofore in motor vehicles, such as automobiles, in which the body is sprung on wheels, or on unsprung axles that carry said wheels, the rear end of the body has tended to dip while the forward end has raised, upon starting the vehicle. The more abrupt the starting movement, the more noticeable the dipping movement. Unless the passengers have been firmly seated and with their backs against the backs of the seats, they would be thrown rearwardly more or less violently when the vehicle was started.

In my United States Letters Patent No. 2,434,055 of January 6, 1948, I showed one system for substantially eliminating the tendency of a vehicle to skid when the brakes were applied and when the vehicle was moving at a high speed at the time of said application.

One of the objects of this invention is to provide a structure that is adapted to accomplish the results of the invention as defined in said co-pending application, and which structure also operates to overcome the objectionable tendency of the rear end of the vehicle to dip when the automobile is started.

Another object of the invention is the provision of means that tend to give the vehicle better traction than heretofore, particularly at the moment of starting.

A still further object of the invention is the provision of simple, economical and safe mechanical system in a motor vehicle for stabilizing the vehicle on the road and for stabilizing the body that is sprung on the wheels of the vehicle under circumstances where the conventional structure fails to provide the desired control and stability.

As already stated, the structure disclosed in my said co-pending application and the present invention, accomplish certain similar results, such as the prevention of skidding upon such sudden and strong actuation of the brakes that the vehicle would normally skid to the point of loss of control. In said co-pending application the means for accomplishing the said results requires a backing plate that is rotatable relative to the brake drum, and with said drum to a limited degree. This required modification of present day systems. The present invention is adapted to accomplish the desired results without altering the present brakes or brake systems.

Other objects and advantages will appear in the description and in the drawings.

In the drawings, Fig. 1 is a plan view of the rear end of the chassis of an automobile, a portion of the body being indicated on said chassis.

Fig. 2 is an enlarged sectional view taken substantially along the line 2—2 of Fig. 1.

Fig. 3 is a fragmentary enlarged sectional view taken along line 3—3 of Fig. 1.

Fig. 4 is a plan view of the portion shown in Fig. 3.

Fig. 5 is a semi-diagrammatic view of a conventional method of springing a chassis on a rear axle.

Fig. 6 is the structure of Fig. 5 from the same point of view but showing the same in a position when the wheel (not shown) at the other end of the axle is elevated, as would occur upon such wheel going over a bump.

Fig. 7 is a semi-diagrammatic view of a structure of this invention, which view corresponds in all other respects with the view shown in Fig. 6.

In Figs. 5, 6, 7 the body frame and the springs are shown in section.

In detail, referring to Fig. 1, the rear wheels of a four-wheeled vehicle are indicated at 1. Each of said wheels is rotatably supported on the usual axle housing 2 having a differential intermediate its ends in the differential housing 3. The usual axles 4 (Figs. 2 to 7) in housing 2 are respectively connected with wheels 1 for driving the latter. The conventional propeller shaft 5 from the transmission is connected with the pinion shaft (not shown) that extends through the forward projection 6 of said differential housing for driving the axles 4, and the usual universal joint 7 connects the propeller shaft with the pinion shaft (Figs. 1, 2).

A brake drum 8 is rigid with each rear wheel and a backing plate 9 coaxial with each drum and rigid with axle housing 2 carries brake shoes 10 (Fig. 2) actuated by a hydraulic motor 11 carried on each backing plate upon admission of hydraulic pressure through a conduit 12 connected with each motor 11.

The foregoing structure is all old and no claim to invention is made with respect to said structure in itself.

Axle housing 2 is connected with the body by link means generally indicated at 15. The said means, as illustrated, comprises a pair of links positioned eccentric to the axis of said housing forwardly thereof and between wheels 1 and within the laterally projected confines of the peripheral outlines of said wheels (Figs. 1, 2). The said links are preferably spaced from the axis of housing 2 a distance nearly equal to the radius of either of the wheels. This distance may vary, as will later be explained, according to the efficiency of the brakes and the flexibility of the springs. The more efficient the brakes or the more flexible the springs, the greater said distance may be, although the distance will generally be fairly close to the said radius.

Said links 15 extend substantially vertically, and are adjacent the universal joint 7 and at opposite sides thereof.

The links are identical in structure, therefore a description of one is a description of the other. Each link comprises a chain 16 enclosed in a fairly rigid straight length of tubing 17, which tubing is preferably of rubber or synthetic rubber, having suitable reinforcement and a coil spring 18 embedded therein. The purpose of said spring is to reinforce the tubing and to also permit slight flexing if sufficient force is exerted, and which spring also insures against flattening or permanent distortion of said tube.

An adjustable eye 19 secures the upper end of chain 16 to a cross frame member 20 of the body or chassis, while a similar eye 21 secures the lower end of the chain to a member 22 that is rigid with the axle housing 2. Said member 22 may be formed integrally with the axle or differential housing or may be welded thereto, and the same projects forwardly thereof below portion 6 of the differential housing.

In the above manner the body is connected with the axle housing 2 so that rotation of the axle housing in either direction about its axis will be resisted by the body or body frame and in order to rotate clockwise as seen in Fig. 2, the body must be moved downwardly, while in order to rotate counter-clockwise, the body must be elevated.

The eye 19 has a threaded shank 25 that extends through the frame member 20, and nuts 26 on said shank above said frame member may be rotated to draw the chain taut, with the ends of tube 17 tight against the frame member 20 and member 22, respectively.

The eye 21 may also be provided with a threaded shank 27 that extends through an opening in member 22 and nuts 28 on the projecting end may be turned to adjust the tension on the chain, thus an adjustment is provided at both or either of the ends of each link.

A metal strap 30 secures member 22 to the portion 6 of the universal housing 3, which strap may be welded to said portion or secured thereto in any other suitable manner.

The use of strap 30 could be omitted where the member 22 is cast integrally with the differential or axle housing. Also one link 15 could be used instead of two, but two is preferable for safety's sake and for symmetry.

The conventional semi-elliptical rear springs 31 are normally rigidly secured to the axle housing 2 by means of U-bolts 31 substantially as seen in Figs. 5, 6. With the present invention a bearing secures each of the springs to the axle housing so as to permit rotation of the axle housing relative to the springs.

Each bearing for each rear spring 31 comprises a section 33 of a ball or spherical bearing. Each section embraces the housing coaxial therewith and is secured to the axle housing at the point formerly occupied by the conventional spring perch.

The springs 31 are each clamped by U-bolts 34 to one-half 35 of a socket bearing that is in turn bolted to the other half 36. These halves constitute a socket bearing that receives the section 33 thereby providing a ball and socket joint that secures each spring to the axle housing. The half 34 is preferably below the axle housing and the spring 31 is below half 34, thus being underslung below the ball and socket bearing.

By the above structure the axle housing 2 is free to rotate in either direction, and as seen in Fig. 7, any unequal springing of the rear axle will substantially reduce the tendency of the spring leaves to twist, as occurs in the conventional structure seen in Fig. 6. The halves 35, 36 do not extend at their side edges to the housing 2 (Fig. 4) which enables each spring bearing to function as seen in Fig. 7 for reducing said twisting of the leaves.

In operation, when the automobile is started from a stationary position, the rear axle housing 2 strongly tends to rotate counter-clockwise as seen in Fig. 2, but the tubing 17 prevents such rotation unless the force is sufficient to raise the body and expand the springs 31. This tendency continues as long as the engine is delivering power to the rear wheels, and is directly proportional to the tractional resistance where the engine is running at a constant speed, or to the degree of power delivered to the rear wheels where the tractional resistance or load is constant. The result of the above tendency is an apparent increase in tractional efficiency of the rear wheels since the upward thrust of member 22 on the tubing tends to cause the rear axle housing to move downwardly. Thus in driving over inequalities in the highway the rear wheels are constantly being urged downwardly and instead of skittering on the road surface, the tires tend to grip it more closely. When the vehicle coasts against the compression of the engine the member 22 tends to pull the rear end of the body downwardly and the same result occurs when the emergency brake is applied, the latter being on the propeller shaft.

Inasmuch as the body tends to be raised upon starting the automobile, and which tendency is noticeable, particularly to passengers in the rear seat, it is seen that the prior tendency with conventional structure for the rear end of the body to dip and thereby throw the passengers rearwardly, is eliminated.

Upon application of the brakes, the axle housing 2 tends to turn clockwise, as seen in Fig. 2, and instead of the rear end of the body being thrown upwardly, as in conventional structure, the rear end is pulled downwardly, or is held stationary, according to the speed of the vehicle when the brakes are applied and to the degree of force with which they are applied. The more violent the stop, and the faster the automobile is moving when the brakes are applied, the more severely is the rear end of the automobile depressed. If the automobile is moving slowly, or if the brakes are applied slowly, the rear end may merely be held against rising, although the sensation to the riders is that the body is being moved downwardly. In any event, the riders are not thrown forwardly as usually occurs.

The above action under a braking operation again increases the traction of the tires on the road, and the danger of skidding upon a fast stop when the vehicle has been traveling at a high rate of speed is substantially eliminated. Likewise the hazard of skidding upon application of the brakes when the vehicle is making a turn is greatly reduced inasmuch as the body is held down and level with the running gear instead of tending to topple over under the influence of centrifugal force. The sensation to the riders is that the body tends to "bank" on a turn when the brakes are applied, although it is believed that the body is merely held from swaying on its springs toward the outside of the turn.

In moving the automobile under power in reverse, the rear end tends to move downwardly, thus counteracting the tendency to throw the pansengers forwardly, and upon application of the brakes when the vehicle is moving rearwardly, the rear end tends to be moved upwardly, thereby counteracting the tendency to throw the passengers rearwardly and downwardly.

While the structure herein disclosed is described as tending to move the body upwardly or downwardly relative to the unsprung running gear, the actual movement of the body, rather than a tendency to move, occurs where the speed of the vehicle upon braking is relatively high and the application of the brakes is strong and where considerable power is required to move the vehicle forwardly or rearwardly or where the power is suddenly applied to the rear wheels.

The line 50 in Fig. 2 indicates about the initial position of the pinion shaft axis relative to the propeller shaft when the body does not carry a load and no power is being transmitted to the pinion shaft. In this position the axes of the pinion shaft and propeller shaft may intersect at the universal joint in an upwardly directed angle instead of the normal downwardly directed angle. The length of the tubing 17 determines the degree of this angle.

As seen in Fig. 2, the body is shown as it would appear when normally loaded with a full load, in which position the angle between the pinion shaft and the propeller shaft is directed downwardly and is at about the angle that is conventional. The line 51 indicates the axis of the pinion shaft.

The line 52 represents about the maximum axis of the pinion shaft when the brakes are strongly and suddenly applied and when the vehicle was moving at a high rate of speed. Thus the angle through which the pinion shaft moves is actually less than in conventional structure, but this movement, which is the same as the movement of member 22, is utilized to accomplish the results that are most desired.

It is to be noted that by reason of the body and the universal joint 7 (and consequently the portion 6 of the differential housing and the propeller shaft 5) moving together at all times in uniform spaced relation, the tunnel now formed in the bottom of the body of the vehicle, in most instances, could be greatly reduced in depth, if not eliminated entirely. This tunnel is now purposely made deep to insure against the propeller shaft striking the body as the torque causes rotation of the rear axle housing within the limits of the springs where the vehicle is driven through the springs.

While the provision of two links 15 doubles the margin of safety against accidential breakage of the links, I provide additional safety means in the form of a pair of arms 55 rigidly secured to the rear axle housing 2 adjacent each end thereof (Figs. 1, 3, 4). These arms extend radially of the axis of the housing, forwardly and rearwardly thereof, and each is provided with a projection 56 (preferably covered with rubber) at its outer end. Projections 56 extend over the spring 31, and are spaced therefrom a sufficient distance to enable movement of the axle 2, under normal driving conditions, without the projections striking the springs. However, in fast starting in low gear with an empty car, the rear projection may engage the spring. If both links 15 were to break, there would be no serious injury since one or the other of the projections would engage the spring to limit its rotation.

The provision of the ball and socket structure connecting the springs with the axle frees the axle housing for rotation relative to the springs and also improves the efficiency of the other features of the invention. The release of the springs from the function of torque convertors enables them to perform the main function for which they are provided.

As seen in Figure 5, the ordinary structure rigidly secures the springs to the axle housing. Upon unequal springing of the axle (Fig. 6) the body 60 tends to stay where it was. The closer the body is permitted to stay in said position, the better. However, since the springs of Figs. 5 and 6 are rigid with the axle 2, the unequal springing immediately tends to twist the springs and to cause the body to move with the springs and axle, thereby doing the reverse of the desired action of leaving the body in the original position. Also the twisting of the springs immediately reduces their flexibility and their capacity to absorb the shock or to freely flex under it. In other words, the springs are virtually stiffened.

As diagrammatically illustrated in Fig. 6, the distance X shows the degree of movement that the body would have to make before it was free from the force tending to move it from its original position upon a predetermined unequal springing of the rear wheels relative to the body.

In Fig. 7 is illustrated the ball and socket bearing of the present invention, and it will be seen that for the same amount of unequal springing of the rear wheels, the tendency is to move the body directly laterally the distance Y which is only about half the distance X, and the only tendency of the springs to twist is that which occurs due to the movement of the bearings slightly closer together than the distance between the points at opposite sides of the body to which the springs are connected. This slight twisting causes a desirable soft checking of the spring action. The effect is that of a cushion.

It is also pertinent to note that the action of the present system as a whole is not affected by any possible unequal braking of the rear wheels. The evils of unbalanced braking are not corrected by the present system although they are lessened. Heretofore, as in my said co-pending application, the brakes should be substantially balanced; that is, the braking action should be substantially equal and equal power should be simultaneously applied to each brake, otherwise the coils of unbalanced brakes may be augmented. However, with the present system in which the torque of the rear axle housing is used, as distinguished from the torque of each rear wheel separately, there is no such augmentation.

It is to be understood that the detailed description and drawings are not to be considered restrictive of the invention, but instead, they are merely illustrative thereof.

I claim:

1. In a vehicle having a pair of coaxial power driven wheels rotatably supported on the outer ends of an axle housing, braking means for said wheels adapted to transmit the torque from said wheels to said housing including friction means carried by said wheels and by said housing respectively and supported for movement into frictional engagement with each other, a body, spring means supporting said body on said housing, pivot means pivotally securing said spring means to said housing for freeing said spring means from said torque, and means connecting said housing to said body at a point forwardly of said housing relative to the forward end of said vehicle and substantially within the laterally projected confines of said wheels for transmitting said torque to said body in a downward direction when said vehicle is moving forwardly and the brakes are applied.

2. In a vehicle having a pair of coaxial power driven wheels rotatably supported on the outer ends of an axle housing that is rigid from end to end thereof, braking means for said wheels adapted to transmit the torque from said wheels to said housing including friction means carried by said wheels and by said housing respectively and supported for movement into frictional engagement with each other, a body, spring means supporting said body on said housing, universal pivot means securing said spring means to said housing for freeing said spring means from said torque and from tension forces upon unequal springing of said wheels relative to said body, and means connecting said housing to said body at a point forwardly of the axis of said housing relative to the forward end of said vehicle and between said wheels substantially within the laterally projected confines of the latter to transmit the braking torque from said housing to said body in a downwardly direction when said vehicle is moving forwardly and the brakes are applied.

3. In a vehicle having a pair of coaxial power driven wheels rotatably supported on the outer ends of an axle housing, braking means for said wheels adapted to transmit the torque from said wheels to said housing including friction means carried by said wheels and by said housing respectively and supported for movement into frictional engagement with each other, a body, spring means supporting said body on said housing, pivot means pivotally securing said spring means to said housing for freeing said spring means from said torque, and means connecting said housing to said body at a point forwardly of said housing relative to the forward end of said vehicle and substantially within the laterally projected confines of said wheels for transmitting said torque to said body in a downward direction when said vehicle is moving forwardly and the brakes are applied, stop means separate from said last mentioned means for limiting the degree of rotation of said housing in the event said last mentioned means should become inoperative.

4. In a vehicle having a pair of coaxial power driven rear wheels rotatably supported on the outer ends of an axle housing, brake drums respectively carried by said wheels and brake shoes carried by said housing and movable into engagement with said drums whereby the torque from said wheels will be transmitted to said housing for tending to rotate the latter when the brakes are applied, a body, springs adjacent the ends of said housing supporting said body on the latter, ball and socket pivot means respectively on said housing and on said springs for universally pivoting said springs to said housing and for freeing said housing from said springs for rotation under the braking torque when the brakes are applied, means for connecting said housing with said body between said wheels and at a point forwardly of said axle housing relative to the forward end of said vehicle and substantially within the laterally projected confines of said wheels for transmitting the braking torque from said housing to said body in a downward direction when said brakes are applied.

5. In a vehicle having a pair of coaxial power driven rear wheels rotatably supported on the outer ends of an axle housing, brake drums respectively carried by said wheels and brake shoes carried by said housing and movable into engagement with said drums whereby the torque from said wheels will be transmitted to said housing for tending to rotate the latter when the brakes are applied, a body, springs adjacent the ends of said housing supporting said body on the latter, ball and socket pivot means respectively on said housing and on said springs for universally pivoting said springs to said housing and for freeing said housing from said springs for rotation under the braking torque when the brakes are applied, means for connecting said housing with said body between said wheels and at a point forwardly of said axle housing relative to the forward end of said vehicle and substantially within the laterally projected confines of said wheels for transmitting the braking torque from said housing to said body in a downward direction when said brakes are applied, driving means for said wheels including a propeller shaft extending centrally between said wheels and at right angles to the axis of said wheels to a source of power on said vehicle, said means for connecting said housing with said body being adjacent said propeller shaft.

6. In a vehicle having a pair of coaxial power driven rear wheels rotatably supported on the outer ends of an axle housing, brake drums respectively carried by said wheels and brake shoes carried by said housing and movable into engagement with said drums whereby the torque from said wheels will be transmitted to said housing for tending to rotate the latter when the brakes are applied, a body, springs adjacent the ends of said housing supporting said body on the latter, ball and socket pivot means respectively on said housing and on said springs for universally pivoting said springs to said housing and for freeing said housing from said springs for rotation under the braking torque when the brakes are applied, a projection rigid with said housing substantially centrally between said wheels and substantially within the laterally projected confines of said wheels and projecting forwardly therefrom, and a flexible link connecting said projection with said body for transmitting the braking torque from said housing to said body in a downward direction when said brakes are applied.

7. In a vehicle having a pair of coaxial power driven rear wheels rotatably supported on the outer ends of an axle housing, brake drums respectively carried by said wheels and brake shoes carried by said housing and movable into engagement with said drums whereby the torque from said wheels will be transmitted to said housing for tending to rotate the latter when the brakes are applied, a body, spring means for supporting said body on said housing, pivot means securing said spring means to said housing for permitting rotation of the latter under said torque, means substantially centrally between the ends of said housing rigid therewith and projecting forwardly therefrom, a link connecting the projecting end of said last mentioned means with said body, said link being positioned at a point offset from the axis of said wheels a distance about equal to the radius of each wheel from its tread portion to its axis.

8. In a vehicle having rear ground wheels rotatable on an axle housing, a source of power for driving said wheels, means connecting said source with said wheels including a drive shaft and gears tending to cause rotation of said housing in a direction opposite to the direction of rotation of said wheels when said source is driving said wheels and tending to cause rotation of said housing in the direction of rotation of said wheels when the rate of rotation of said wheels tends to exceed the rate at which said source is adapted to drive them, a body, springs rotatably secured to said housing supporting said body on said housing, and means for connecting said housing with said body at a point spaced forwardly of said housing relative to the forward end of said vehicle and substantially within the laterally projected confines of said wheels for transmitting the torque of said housing to said body upon said housing tendency to rotate in either of said directions.

9. In a vehicle having rear ground wheels rotatable on an axle housing, a source of power for driving said wheels, means connecting said source with said wheels including a propeller shaft and differential gears tending to cause rotation of said housing in a direction opposite to the direction of rotation of said wheels when said source is driving said wheels and tending to cause rotation of said housing in the direction of rotation of said wheels when the rate of rotation of said wheels tends to exceed the rate at which said source is adapted to drive them, a body, springs rotatably secured to said housing supporting said body on said housing whereby said housing is free from said springs for said rotation in said directions, and means positioned substantially centrally of the width of said body securing said body to said housing at a point spaced forwardly of said housing relative to the forward end of said vehicle and substantially within the laterally projected confines of said wheels for variably limiting the degree of rotary movement of said housing in said directions according to the degree of torque of said housing and the amount of the load on said springs and the degree of resistance of said springs to flexing.

10. In a vehicle having rear ground wheels rotatable on an axle housing, a source of power for driving said wheels, means connecting said source with said wheels including a propeller shaft and differential gears tending to cause rotation of said housing in a direction opposite to the direction of rotation of said wheels when said source is driving said wheels and tending to cause rotation of said housing in the direction of rotation of said wheels when the rate of rotation of said wheels tends to exceed the rate at which said source is adapted to drive them, a body, springs rotatably secured to said housing supporting said body on said housing whereby said housing is free from said springs for said rotation in said directions, and means positioned substantially centrally of the width of said body securing said body to said housing for variably limiting the degree of rotary movement of said housing in said directions according to the degree of torque of said housing and the amount of the load on said springs and the degree of resistance of said springs to flexing, said last mentioned means including a lateral projection on said housing extending forwardly thereof relative to the rear end of said vehicle, and a link connecting the projecting end of said projection with said body, said link being positioned at a point a distance from the axis of said housing about equal to the radius of either of said wheels.

11. In a vehicle having a body, an axle housing below said body rotatably supporting rigidly connected brake drum and traction wheel assemblies thereon, and backing plates rigid with said housing provided with brake shoes movable into engagement with said drums; means connecting said housing with said body positioned to transmit the torque of said housing to said body in a downward direction upon engagement between said shoes and drums, springs adjacent to each of said wheels supporting said body on said wheels and compressible under the influence of said torque, said means being spaced forwardly of said housing relative to the forward end of said vehicle and between said wheels substantially within the lateral confines of the latter, pivot means securing said springs to said axle housing for permitting transmission of said torque to said body through said first mentioned means substantially free from resistance by said springs.

12. In a vehicle having a body sprung on rear ground wheels that are rotatable on an axle housing and means for driving said wheels including a source of power connected with a drive shaft and gears tending to cause rotation of said housing in a direction opposite to the direction of rotation of said wheels when said source is driving said wheels and tending to cause rotation of said housing in the direction of rotation of said wheels when the rate of rotation of said wheels tends to exceed the rate at which said source is adapted to drive them, means connecting said housing with said body at a point spaced forwardly of said housing relative to the forward end of said vehicle and substantially within the laterally projected confines of said wheels for transmitting the torque of said housing to said body in a downward direction at said point, and means respectively carried by said housing and said body and engageable at points spaced at opposite sides of said housing upon predetermined rotation of said housing in either of said directions in an arc of predetermined length for limiting the degree of said movement in either of said directions.

13. In a vehicle having a body sprung rear ground wheels that are rotatable on an axle housing and means for driving said wheels including a source of power connected with a drive shaft and gears tending to cause rotation of said housing in a direction opposite to the direction of rotation of said wheels when said source is driving said wheels and tending to cause rotation of said housing in the direction of rotation of said wheels when the rate of rotation of said wheels tends to exceed the rate at which said source is adapted to drive them, means connecting said housing with said body at a point spaced forwardly of said housing relative to the forward end of said vehicle and substantially within the laterally projected confines of said wheels for transmitting the torque of said housing to said body in a downward direction at said point, and means respectively carried by said housing and said body and engageable at points spaced at opposite sides of said housing upon predetermined rotation of said housing in either of said directions in an arc of predetermined length for limiting the degree of said movement in either of said directions, said last mentioned means being out of engagement with each other during the movement of said housing between the ends of said arc.

CHRISTIAN H. SAUER.

(References on following page)

REFERENCES CITED

The following references are of record in the file of this patent:

UNITED STATES PATENTS

| Number | Name | Date |
|---|---|---|
| 879,027 | Lelaunay | Feb. 11, 1908 |
| 1,759,370 | Rhodin | May 20, 1930 |
| 1,940,795 | Gerardi | Dec. 26, 1933 |
| 2,044,242 | Fairclough, Jr. | June 16, 1936 |
| 2,055,975 | Haltenberger | Sept. 29, 1936 |
| 2,085,454 | Mercier | June 29, 1937 |
| 2,106,874 | Paton | Feb. 1, 1938 |
| 2,236,410 | Leighton | Mar. 25, 1941 |
| 2,299,900 | Jackson | Oct. 27, 1942 |
| 2,345,448 | Best | Mar. 28, 1944 |
| 2,408,264 | McClure | Sept. 24, 1946 |

FOREIGN PATENTS

| Number | Country | Date |
|---|---|---|
| 379,293 | France | Sept. 5, 1907 |
| 420,166 | Great Britain | Nov. 27, 1934 |